Figure 1:
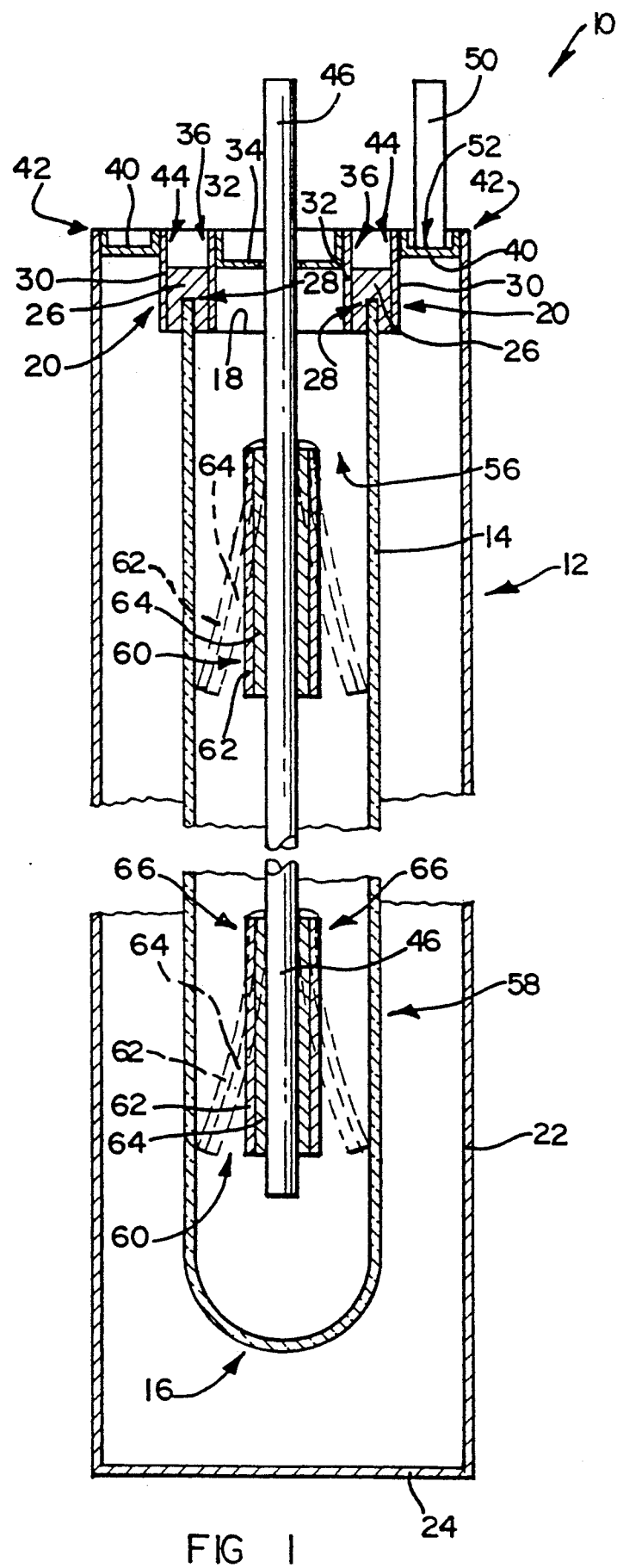

United States Patent [19]

Ducan

[11] Patent Number: 5,208,119
[45] Date of Patent: May 4, 1993

[54] ELECTROCHEMICAL CELL
[75] Inventor: James H. Ducan, Stafford, England
[73] Assignee: AABH Patent Holdings Societe Anonyme, Luxembourg, Luxembourg
[21] Appl. No.: 665,989
[22] Filed: Mar. 7, 1991
[30] Foreign Application Priority Data Mar. 12, 1990 [GB] United Kingdom ............... 9005485

[51] Int. Cl.$^5$ .................. H01M 2/26; H01M 4/20; H01M 6/20
[52] U.S. Cl. ................................ 429/103; 429/161; 429/211
[58] Field of Search ............... 429/103, 104, 161, 211

[56] References Cited

U.S. PATENT DOCUMENTS

| | | |
|---|---|---|
| 2,754,348 | 7/1956 | Berchielli ............................ 429/211 |
| 3,116,172 | 12/1963 | Wilke et al. ........................ 429/161 |
| 3,513,034 | 5/1970 | Fischbach et al. .................. 429/211 |
| 3,767,465 | 10/1973 | Wakefield ........................... 429/211 |
| 4,529,676 | 7/1985 | Galloway et al. . |
| 4,546,055 | 10/1985 | Coetzer et al. . |
| 4,560,627 | 12/1985 | Bones et al. . |
| 4,592,969 | 6/1986 | Coetzer et al. . |
| 4,626,483 | 12/1986 | Bones et al. . |
| 4,722,875 | 2/1988 | Wright . |
| 4,772,449 | 9/1988 | Bones et al. . |
| 4,797,333 | 1/1989 | Coetzer et al. . |
| 4,871,626 | 10/1989 | Williams ............................. 429/104 |
| 4,939,048 | 7/1990 | Vignaud ............................. 429/211 |
| 4,975,343 | 12/1990 | Coetzer . |
| 5,053,295 | 10/1991 | Hope et al. ......................... 429/211 |

FOREIGN PATENT DOCUMENTS 1529854 10/1978 United Kingdom .

Primary Examiner—Wayne Langel
Attorney, Agent, or Firm—Arnold, White & Durkee

[57] ABSTRACT

A high temperature rechargeable electrochemical power storage cell comprises an anode compartment containing a molten alkali metal anode; a cathode compartment containing an alkali metal aluminum halide molten salt electrolyte, and a cathode which comprises an electronically conductive electrolyte-permeable porous matrix which has dispersed therein an active cathode substance, with the matrix being impregnated with said molten electrolyte; a separator separating the anode compartment from the electrolyte; and at least one bimetallic current collector in one of the cell compartments. The bimetallic current collector is such that, when the cell is at ambient temperature, the current collector is in a first non-deformed configuration. However, when the cell is at its normal operating temperature, the current collector is in a second deformed configuration. The deformation of the current collector results from the difference in co-efficients of thermal expansion of the metals making up the bimetallic current collector. The current collector in its second configuration bears against the separator, thereby to make electrical contact with the separator.

10 Claims, 2 Drawing Sheets

ELECTROCHEMICAL CELL

THIS INVENTION relates to an electrochemical cell. It relates also to a current collector assembly for an electrochemical cell.

According to a first aspect of the invention, there is provided a high temperature rechargeable electrochemical power storage cell comprising (i) an anode compartment containing, at the operating temperature of the cell and when the cell is in its charged state, a molten alkali metal anode; (ii) a cathode compartment containing, at said operating temperature and in said charged state, an alkali metal aluminum halide molten salt electrolyte which is also molten at the operating temperature of the cell, and having the formula $MAlHal_4$, wherein M is the alkali metal of the anode and Hal is a halide, the cathode compartment also containing in said charged state, a cathode which comprises an electronically conductive electrolyte-permeable porous matrix which has dispersed therein an active cathode substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte; (iii) a separator separating the anode compartment from the electrolyte, the separator comprising a solid conductor of the ions of the alkali metal of the anode or a micromolecular sieve which contains said alkali metal sorbed therein; and (iv) at least one bimetallic current collector in one of the cell compartments, the bimetallic current collector being such that, when the cell is at ambient temperature, the current collector is in a first non-deformed configuration, and, when the cell is at its normal operating temperature, the current collector is in a second deformed configuration, with the deformation of the current collector resulting from the difference in co-efficients of thermal expansion of the metals making up the bimetallic current collector, and the current collector in its second configuration bearing against the separator, thereby to make electrical contact with the separator.

The cell may comprise an outer tubular casing, with the separator also being of tubular form but of smaller diameter than the outer casing such that an annular gap, defining the one cell compartment ('the annular compartment') is provided between the separator and the outer casing, while the other cell compartment (' the central compartment) is provided by the inside of the separator, and with the ends of the separator and the outer casing being sealed off with end pieces in such a fashion that the separator and casing are electrically insulated from each other. The cell may include a current collecting rod or bar protruding through an orifice in the circular end piece into the central compartment, with the bimetallic current collector being fast with the bar or rod. Instead, or additionally, a current collecting rod or bar may protrude through the annular end piece into the annular compartment, with at least one of the bimetallic current collectors being fast with the bar or rod.

The bimetallic current collector may be of elongate or strip form, with the one end thereof being attached, eg by welding, to the bar or rod such that the bimetallic current collector is aligned longitudinally along the bar with its free end abutting the bar when the bimetallic current collector is in its first configuration and the metal having the lowest co-efficient of thermal expansion being closest to the separator so that it does not abut the bar. The bimetallic current collector is thus fixed cantilever fashion to the bar or rod so that when the cell is at its operating temperature, the bimetallic current collector will adopt its second configuration in which its free end is spaced from the bar and in electrical contact with the separator. Instead, both ends of the current collector strip may be attached to the bar or rod with the strip, in its first configuration, abutting against the bar or rod, and, in its second configuration, assuming a bulbous configuration in which a middle portion thereof abuts against the separator.

The current collector assembly comprising the bar and the bimetallic current collector attached thereto can hence, on assembly of the cell, fit through a cell housing orifice having a relatively small cross sectional area. However, at the operating temperature of the cell there will then be contact of the bimetallic current collector against the separator, as hereinbefore described, ensuring sufficient current carrying capacity for the assembly.

The small orifice or aperture facilitates sealing of the cell. Furthermore, in the case of a current collector consisting only of a metallic bar or rod which is in contact with the separator, there are the risks that, on the temperature of the cell rising to its operating temperature, the bar or rod could lose contact with the separator, if its co-efficient of thermal expansion is less than that of the separator, or it could expand to break the separator, if its co-efficient of thermal expansion is greater than that of the separator. This drawback is hence at least alleviated with the bimetallic current collector of the present invention since sufficient of the individual bimetallic current collectors or strips can be attached to the bar or rod to provide a desired current carrying capacity while the individual strips can be sized so that, when in their second configuration, they are distorted or deformed sufficiently to make adequate electrical contact with the separator, but not to impose a sufficiently great force in the separator to break it. The degree of displacement and force imposed by the individual strips can be calculated according to the formulae $$D = \frac{K_{DS} \Delta T L^2 m}{t} \quad (1)$$

where
D is the degree of deflection of the free end of the strip from the rod, expressed as the distance which the free end of the strip is spaced from the bar when the strip is in its second configuration, in inches $K_{DS}$ is a deflection constant for the strip $\Delta T$ is the change in the cell temperature in going from ambient to operating temperature, in ° F.

L is the active length of the element, in inches m is the specific deflection for the strip and is defined as constrained deflection unconstrained deflection t is thickness of the strip, in inches $$P = \frac{K_{DS} K_{PS} \Delta T b t^2 (1 - m)}{L} \quad (2)$$

where
P is the load or force, in ounces
$K_{DS}$, $\Delta T$, t, m and L are as hereinbefore defined $K_{PS}$ is a torque constant for the strip
b is the width of the strip, in inches.

Hence, generally, the degree of deflection of the strips is dependent on their length, while the force imposed by the strips on the separator is dependent on their thickness.

The feature that a high current capacity current collector assembly can pass through an orifice, having a relative small cross-sectional area on assembly of the cell, naturally makes the current collector assembly suitable for use in cells having other geometric shapes, particularly geometric shapes where the cell geometry dictates that the current collector assembly aperture should have a small cross-sectional area.

In a particular embodiment of the invention, the alkali metal, M, may be sodium; the separator may be nasicon, $\beta$-alumina or $\beta''$-alumina; Hal may be chloride so that the electrolyte is $NaAlCl_4$, and the transition metal T may be Ni, Fe or mixtures thereof, so that the cell has, as its cell reaction

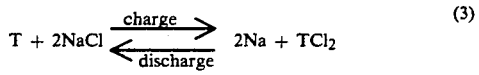

(3)

The current collector assembly, comprising the current collecting rod and a plurality of the bimetallic strips attached thereto, may be located in the anode compartment.

The or each bimetallic current collector may be composed of abutting nickel and iron strips. Instead, it may be composed of abutting iron and aluminum strips. However, any other suitable metal combinations can instead be used. When the strip is composed of nickel and iron, then it may be standard British Driver-Harris material, such as grades 2400 and 3620.

Instead of being in strip form, the current collector can be of any other suitable form. For example, it may be in the form of a spiral or helical coil around the current collecting rod or bar; at least one disc protruding radially outwardly from, and extending circumferentially around, the current collecting rod; etc. The exact form or design of the current collector, and the design of the current collecting rod with the current collector attached thereto, will depend on the cell geometry and the spatial arrangement or array within the cell.

In cells of this type, the cathode compartment can initially be loaded with a powder mixture of various constituents including Ni and/or Fe powder, NaCl and $NaAlCl_4$ as a molten salt electrolyte comprising equimolar proportions of NaCl and $AlCl_3$, as described in, for example, U.S. Pat. No. 4,772,875. In this fashion is thus formed a cathode precursor in the cell, which functions as a discharged cathode during the first charge cycle on commissioning the cell. Instead, Al powder can initially also be loaded into the cathode compartment, such as described in published British Application No. 2191332A. U.S. Pat. No. 4,772,875 and published British Application No. 2191332A are hence incorporated herein by reference.

Other refinements of cells of this type, in particular refinements which promote good wetting of the separator surface with the alkali metal on the anode side, can also be incorporated in the cell of the present invention. Thus the separator surface can be doped with the oxide of a transition metal such as manganese as taught by published British Patent Application No. 2195329A.

Instead, however, the surface of the separator in communication with the anode compartment can be coated with a layer of metallic or non-metallic particulate material, as taught by published British Patent Application No. 2213311A.

According to a second aspect of the invention, there is provided a current collector assembly for a high temperature rechargeable electrochemical power storage cell comprising (i) an anode compartment containing, at the operating temperature of the cell and when the cell is in its charged state, a molten alkali metal anode; (ii) a cathode compartment containing, at said operating temperature and in said charged state, an alkali metal aluminum halide molten salt electrolyte which is also molten at the operating temperature of the cell, and having the formula $MAlHal_4$, wherein M is the alkali metal of the anode and Hal is a halide, the cathode compartment also containing in said charged state, a cathode which comprises an electronically conductive electrolyte-permeable porous matrix which has dispersed therein an active cathode substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte; and (iii) a separator separating the anode compartment from the electrolyte, the separator comprising a solid conductor of the ions of the alkali metal of the anode or a micromolecular sieve which contains said alkali metal sorbed therein, the assembly comprising a current collecting member locatable in one of the cell compartments; and at least one bimetallic current collector attached to the member such that at ambient temperature the current collector is in a retracted or non-deformed configuration, while at elevated temperature it is in an extended or deformed configuration as a result of the difference in co-efficients of thermal expansion of the metals making up the bimetallic current collector.

As mentioned hereinbefore, the current collector may be of elongate strip form having its one end attached to the member so that, in its retracted configuration, it extends alongside the member, while in its extended configuration, a portion thereof is spaced from the member; and the current collecting member may be in the form of a rod, with a plurality of the elongate current collectors being attached to the rod.

The invention will now be described, by way of example, with reference to the accompanying schematic drawings.

In the drawings

Figure 2:
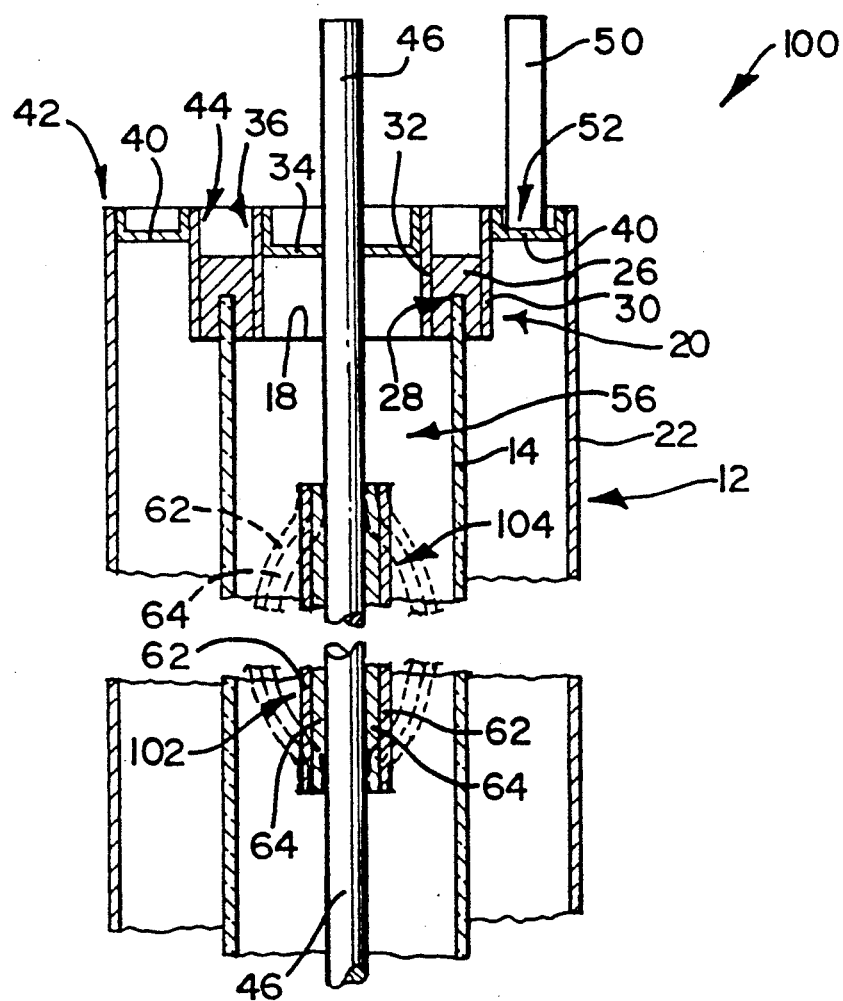

FIG. 1 shows a sectional side elevation of an electrochemical cell in accordance with one embodiment of the invention; and FIG. 2 shows a sectional side elevation of part of an electrochemical cell in accordance with another embodiment of the invention.

Referring to FIG. 1, reference numeral 10 generally indicates an electrochemical cell in accordance with one embodiment of the invention.

The cell 10 includes an outer cylindrical casing 12 having a side wall 22 connected to a circular floor 24; a beta-alumina tube 14 located concentrically within the casing 12, the tube 14 being closed at its one end 16 and open at is other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular groove 28 in the ring. Two concentric truncated cylinders of nickel, designated 30, 32, are bonded fluid-tight to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, eg welded, to the casing at 42 and to the ring 30 at 44. A steel rod current collector 46 projects into the tube 14, and a steel rod current collector 50 protrudes from the disc 40 at 52.

An anode compartment 56 is hence provided inside the tube 14, with a cathode compartment 58 being provided around the outside of the tube 14, within the casing 12, the beta-alumina tube 14 hence constituting a separator between the anode and cathode compartments.

The cell 10 also includes a plurality of bimetallic current collector strips 60. The strips 60 are typically those available from British Driver-Harris under the trade name BD-H/Chace Thermostatic Bimetal, grade 2400 or 3620 which are both composed of a layer 62 of iron and a layer 64 of nickel, bonded together. The one end of each of the strips 60 is spot-welded to the rod 46 at 66, such that the strips 60 at ambient temperature are aligned axially with, and abut against, the rod 46. However, at the operating temperature of the cell the strips 60 will bend, distort or deform to the positions indicated in broken line, in which their free ends bear against the separator 14, making electrical contact therewith.

For a strip 60 composed of grade 3620 material, and having an effective length of 1.25 inches and a thickness of 0.032 inches, it was calculated that the deflection of its free end would be 3 mm for a 380° F. temperature rise. This was confirmed in a practical test in which the one end of such a strip was spot-welded to a steel rod and the strip heated to 380° F. For a specific deflection ('m') of 0.8, the force exerted by the strip on the separator would be about 5 ounces.

Into the cathode compartment 58 there is initially placed an electrolyte permeable matrix of Fe, with sodium chloride incorporated therein in dispersed form. Sufficient molten NaAlCl$_4$ electrolyte is then added to the cathode compartment so that the matrix is impregnated with the electrolyte and the electrolyte wets the separator or tube 14. The beta-alumina tube 14 hence forms a continuous barrier between the electrolyte containing cathode compartment 58 and the anode compartment 56, within the housing 12.

On charging the cell 10, the following reactions take place in the cathode compartment:

$$2NaCl + Fe \rightleftharpoons 2Na + FeCl_2 ... \quad (4)$$

The Na generated by reaction (2) passes through the beta-alumina into the anode compartment.

Referring to FIG. 2, reference numeral 100 generally indicates an electrochemical cell in accordance with another embodiment of the invention.

Part of the cell 100 which are the same or similar to those of the cell 10 are indicated with the same reference numerals.

Instead of the bimetallic strips 60, bimetallic strips 102 are used. Both ends 104 of these strips are welded to the current collector 46 so that, on the strips expanding, they assume a bow shape or bulbous configuration as indicated in broken line in FIG. 2.

I claim:.

1. A high temperature rechargeable electrochemical power storage cell comprising (i) an anode compartment containing, at the operating temperature of the cell and when the cell is in the charged state, a molten alkali metal anode; (ii) a cathode compartment containing, at said operating temperature and in said charged state, an alkali metal aluminum halide molten salt electrolyte which is also molten at the operating temperature of the cell, and having the formula MAlHal$_4$, wherein R is the alkali metal of the anode and Hal is a halide, the cathode compartment also containing in said charged state, a cathode which comprises an electronically conductive electrolyte-permeable porous matrix which has dispersed therein an active cathode substance THal$_2$ in which Hal is the halide of the electrolyte and T is a transition metal selected from the group of transition metals consisting of Fe, Hi, Co, Cr, Mn and mixtures thereof, the matrix being impregnated with said molten electrolyte (iii) a separator separating the anode compartment from the electrolyte, the separator comprising a solid conductor of the ions of the alkali metal of the anode or a micromolecular sieve which contains said alkali metal sorbed therein; and (iv) a current collector assembly comprising a current collecting member and at least one bimetallic current collector, in at least one of the cell compartments, the bimetallic current collector being composed of abutting layers of first and second metals respectively, with the metals having different co-efficients of thermal expansion and the layers being bonded together, and with a first portion of the bimetallic current collector being attached to the current collecting member so that, when the cell is at ambient temperature, the bimetallic current collector is in a first non-deformed configuration, and, when the cell is at its normal operating temperature, the bimetallic current collector is in a second deformed configuration in which a second portion thereof is spaced further from the current collecting member than in the first configuration, with the deformation of the bimetallic current collector resulting from the difference in co-efficients of thermal expansion of the metals making up the bimetallic current collector, and the second portion of the current collector, in the second configuration of the current collector bearing against the separator, thereby to make electrical contact with the separator.

2. A cell according to claim 1, which comprises an outer tubular casing, with the separator also being of tubular form but of smaller diameter than the outer casing such that an annular gap, defining the one cell compartment ('the annular compartment') is provided between the separator and the outer casing, while the other cell compartment ('the central compartment') is provided by the inside of the separator, and with the ends of the separator and the outer casing being sealed off with end pieces in such a fashion that the separator and casing are electrically insulated from each other, with the current collecting member being in the form of a rod protruding through an orifice in the circular end piece or the annular end piece into the central compartment or the annular compartment respectively.

3. A cell according to claim 2, wherein the bimetallic current collector is of elongate strip form, with the one end thereof being attached to the rod such that the bimetallic current collector is aligned longitudinally along the bar with its free end abutting the bar when it is in its first configuration and the metal having the lowest coefficient of thermal expansion being closest to the separator so that it does not abut the bar, the bimetallic current collector thus being fixed cantilever fashion to the rod so that when the cell is at its operating temperature, the bimetallic current collector will adopt it second configuration in which its free end is spaced from the bar and in electrical contact with the separator.

4. A cell according to claim 2, wherein the bimetallic current collector is of elongate strip form, with both ends thereof being attached to the rod such that the strip is aligned longitudinally along the rod, and with the strip abutting the rod in its first configuration, while in its second configuration it adapts a bulbous configuration in which a middle portion thereof abuts against the separator.

5. A cell according to claim 3, wherein the alkali metal, M, is sodium, the separator is nasicon, β-alumina or β''-alumina; Hal is chloride so that the electrolyte is NaAlCl$_4$, and the transition metal T is Ni, Fe or mixtures thereof, so that the cell has, as its cell reaction

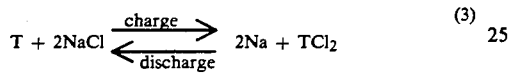

with the current collector assembly being located in the anode compartment and a plurality of the bimetallic current collector strips being provided on the rod.

6. A cell according to claim 5, wherein the bimetallic current collectors are composed of nickel and iron layers.

7. A cell according to claim 5, wherein the bimetallic current collectors are composed of iron and aluminum layers.

8. A current collector assembly for a high temperature rechargeable electrochemical power storage cell comprising (i) an anode compartment containing, at the operating temperature of the cell and when the cell is in its charged state, a molten alkali metal anode; (ii) a cathode compartment containing, at said operating temperature and in said charged state, an alkali metal aluminum halide molten salt electrolyte which is also molten at the operating temperature of the cell, and having the formula MalHal$_4$, wherein M is the alkali metal of the anode and Hal is a halide, the cathode compartment also containing in said charged state, a cathode which comprises an electronically conductive electrolyte-permeable porous matrix which has dispersed therein an active cathode substance THal$_2$ in which Hal is the halide of the electrolyte and T is a transition metal selected from the group of transition metals consisting of Fe, Ni, Co, Cr, Mn and mixtures thereof, the matrix being impregnated with said molten electrolyte; and (iii) a separator separating the anode compartment from the electrolyte, the separator comprising a solid conductor of the ions of the alkali metal of the anode or a micromolecular sieve which contains said alkali metal sorbed therein, the assembly comprising a current collecting member adapted to be located in one of the cell compartments of the cell; and at least one bimetallic current collector being composed of abutting layers of first and second metals respectively, with the metals having different coefficients of thermal expansion and the layers being bonded together, and with a first portion of the bimetallic current collector being attached to the current collecting member so that at ambient temperature the bimetallic current collector is in a non-deformed configuration, while at elevated temperature it is in a deformed configuration in which a second portion thereof is spaced further from the current collecting member than in the non-deformed configuration as a result of the difference in co-efficients of thermal expansion of the metals making up the bimetallic current collector.

9. A current collector assembly according to claim 8, wherein the current collector is of elongate strip form having its one end attached to the member so that, in its non-deformed configuration, it extends alongside the member, while in its deformed configuration, said second portion thereof is spaced from the member.

10. A current collector according to claim 9, wherein the current collecting member is in the form of a rod, with a plurality of the elongate current collectors being provided on the rod.

UNITED STATES PATENT AND TRADEMARK OFFICE
CERTIFICATE OF CORRECTION

PATENT NO. : 5,208,119

DATED : May 4, 1993

INVENTOR : James H. Duncan

It is certified that error appears in the above-identified patent and that said Letters Patent is hereby corrected as shown below:

Title page, under "United States Patent" [Field 19] and in field [75] please change inventor's name "Ducan" to --Duncan--.

Column 6, line 7 (claim 1) before the word "charged" delete the word "the" and replace with --its--.

Column 6, line 13 (claim 1) delete "R" and insert --M--.

Column 6, line 20 (claim 1) delete "Hi" and insert --Ni--.

Signed and Sealed this

First Day of February, 1994

Attest:

BRUCE LEHMAN

*Attesting Officer*  Commissioner of Patents and Trademarks